United States Patent
Pines

(10) Patent No.: US 8,526,593 B2
(45) Date of Patent: Sep. 3, 2013

(54) SYSTEM AND METHOD FOR GENERATING AND UTILIZING ORGANICALLY GROWN CONTENT IN A DIRECTORY ASSISTANCE ENVIRONMENT

(75) Inventor: Robert Pines, New York, NY (US)

(73) Assignee: Grape Technology Group, Inc., Bethlehem, PA (US)

(*) Notice: Subject to any disclaimer, the term of this patent is extended or adjusted under 35 U.S.C. 154(b) by 210 days.

(21) Appl. No.: 13/206,713

(22) Filed: Aug. 10, 2011

(65) Prior Publication Data

US 2011/0293086 A1    Dec. 1, 2011

Related U.S. Application Data

(62) Division of application No. 12/150,319, filed on Apr. 25, 2008, now Pat. No. 8,074,080.

(60) Provisional application No. 60/926,807, filed on Apr. 27, 2007.

(51) Int. Cl.
*H04M 3/42*    (2006.01)

(52) U.S. Cl.
USPC .................................. 379/218.01; 379/218.02

(58) Field of Classification Search
USPC ......................................... 379/218.01, 218.02
See application file for complete search history.

(56) References Cited

U.S. PATENT DOCUMENTS

| | | | |
|---|---|---|---|
| 5,644,680 A | 7/1997 | Bielby et al. | |
| 6,658,389 B1 | 12/2003 | Alpdemir | |
| 6,934,684 B2 | 8/2005 | Alpdemir et al. | |
| 6,977,997 B2 | 12/2005 | Shioda et al. | |
| 7,127,617 B2 | 10/2006 | Wiederin et al. | |
| 7,275,162 B2 | 9/2007 | Wiederin et al. | |
| 7,961,861 B2* | 6/2011 | Kliger | 379/201.01 |
| 2005/0136899 A1 | 6/2005 | Pines et al. | |
| 2005/0163104 A1* | 7/2005 | Christensen et al. | 370/352 |
| 2006/0093120 A1 | 5/2006 | Thorpe et al. | |
| 2006/0156037 A1 | 7/2006 | Wiederin et al. | |
| 2007/0036306 A1 | 2/2007 | Pines et al. | |
| 2009/0010416 A1 | 1/2009 | Pines | |

OTHER PUBLICATIONS

International Search Report dated Aug. 11, 2008.

* cited by examiner

*Primary Examiner* — Creighton Smith
(74) *Attorney, Agent, or Firm* — Sofer & Haroun, LLP

(57) ABSTRACT

A method for providing directory assistance includes receiving a communication from a requestor for a desired contact listing and retrieving a requester profile relating to the requester where the profile including a calling history of the requester. At least one listing is retrieved in response to the communication for a desired contact listing, where the retrieving of the desired listing includes reviewing the calling history of the requester and including, among the at least one retrieved response, a predictive listing.

10 Claims, 15 Drawing Sheets

| Database Listing 60 | | |
|---|---|---|
| Listing ID 62 | Name Field 64 | Contact Field 66 | Category Field 68 |
| ABCD 12345 XYZ | Jake's Pub | 555 555-5555<br>123 ABC street<br>City, State, 12345<br>www.jakespub.com | Bar/Pub |

FIGURE 2

| GUI 25 | |
|---|---|
| Category update field 72 | Rating update field 74 |
| Restaurant    o<br>Movie    o<br>Bar/Pub    o<br>Nightclub    o<br>Amusement    o | Price         -    1 - 2 - 3 - 4 - 5<br>Food Qual   -    1 - 2 - 3 - 4 - 5<br>Atmosphere -    1 - 2 - 3 - 4 - 5 |
| Flagged Listing Field 76 | |
| Disconnected ?      No Answer? | |

FIGURE 3

| Update Listing 80 | |
|---|---|
| Listing Identifier Field 82<br><br>ABCD 12345 XYZ | Update Data 84<br><br>Add    - "Restaurant"<br>Add - Rating "food  -  4"<br>Add - Rating "Price  - 3" |

FIGURE 5

| Caller Profile 120 | |
|---|---|
| Caller ID field 122<br><br>John Q<br>555-555-6666<br>Voice Print | Caller Preferences 124<br><br>All Live Operators |
| | Caller Personal Information 126<br><br>Actor<br>Soccer Fan<br>Movie Fan |

FIGURE 7

| Tracking database record 130 | | | |
|---|---|---|---|
| UCI 132 | Database record 134 | Time and Date 136 | Request information 138 | Caller Information 140 |
| XRBC 123GH45 | Listing ABCD 12345 XYZ Jake's Pub | 7:45.51 PM 3-7-06 | "Jake's Pub" Restaurant | Bill 555-567-5678 Soccer Fan Actor Voice (for voice print analysis) |

FIGURE 8

SYSTEM AND METHOD FOR GENERATING AND UTILIZING ORGANICALLY GROWN CONTENT IN A DIRECTORY ASSISTANCE ENVIRONMENT

RELATED APPLICATION

This application is a divisional application of U.S. patent application Ser. No. 12/150,319, filed on Apr. 25, 2008, which in turn claims the benefit of priority from U.S. Provisional Patent Application No. 60/926,807, filed on Apr. 27, 2007, the entirety of which are incorporated by reference.

FIELD OF THE INVENTION

The present application is related to the field of directory assistance. More particularly, the present application relates to gathering and utilization of organically grown content in the field of directory assistance.

BACKGROUND

In the field of directory assistance, frequently callers request commercial listings either by name (for a specific listing) or by location or category (for listing among a plurality of listings). Such listing information is typically stored in a directory assistance listing database, the contents of which are searched by the live operator or automated platform in response to the caller's request. These listings are organized using pre-existing information such as SIC codes (Standard industry Codes).

However, although this information is usually accurate, differences in how the callers identify the listings can cause confusion. For example, a caller may personally identify a particular listing in their mind in one category where the desired listing may actually be stored under a different category. Furthermore a caller may know a listing by one name (a nickname for example) whereas the listing database may have the desired listing stored under a different name.

Another example of a disconnect between a caller's desire for a one listing versus the ability of the directory assistance system to retrieve that listing is from among a plurality of listings available, arises from the fact that many listings have either exactly or nearly the same name as one another.

OBJECTS AND SUMMARY

The present invention looks to overcome the drawbacks associated with the prior art and to provide a system that collects organically grown content from past directory assistance calls and uses that information to modify and update existing listing categorization data. Furthermore, the present invention provides a system that tracks not only past calls from a particular caller, but also calls to a particular listing and uses those histories to assist in retrieving the correct desired listing.

To this end, the present invention provides for a hod for updating a contact listing. The method includes receiving a request from a requestor for a contact listing corresponding to a desired listing among a plurality of available listings. The request includes one or more information element relating to the desired listing. The desired listing among the plurality of available listings is retrieved and a modification to the retrieved listing is generated based on the one or more information elements relating to the desired listing provided by the requester.

BRIEF DESCRIPTION OF THE DRAWINGS

FIG. 2 is an exemplary database entry from the directory assistance platform of FIG. 1;

FIG. 3 is an exemplary graphic user interface from the directory assistance platform from FIG. 1;

FIG. 5 is an exemplary updated listing from the directory assistance platform from FIG. 1;

FIG. 7 is a user profile as stored is the directory assistance platform of FIG. 6;

FIG. 8 is a tracking profile entry as stored in the directory assistance platform of FIG. 6;

DESCRIPTION

Figure 1:
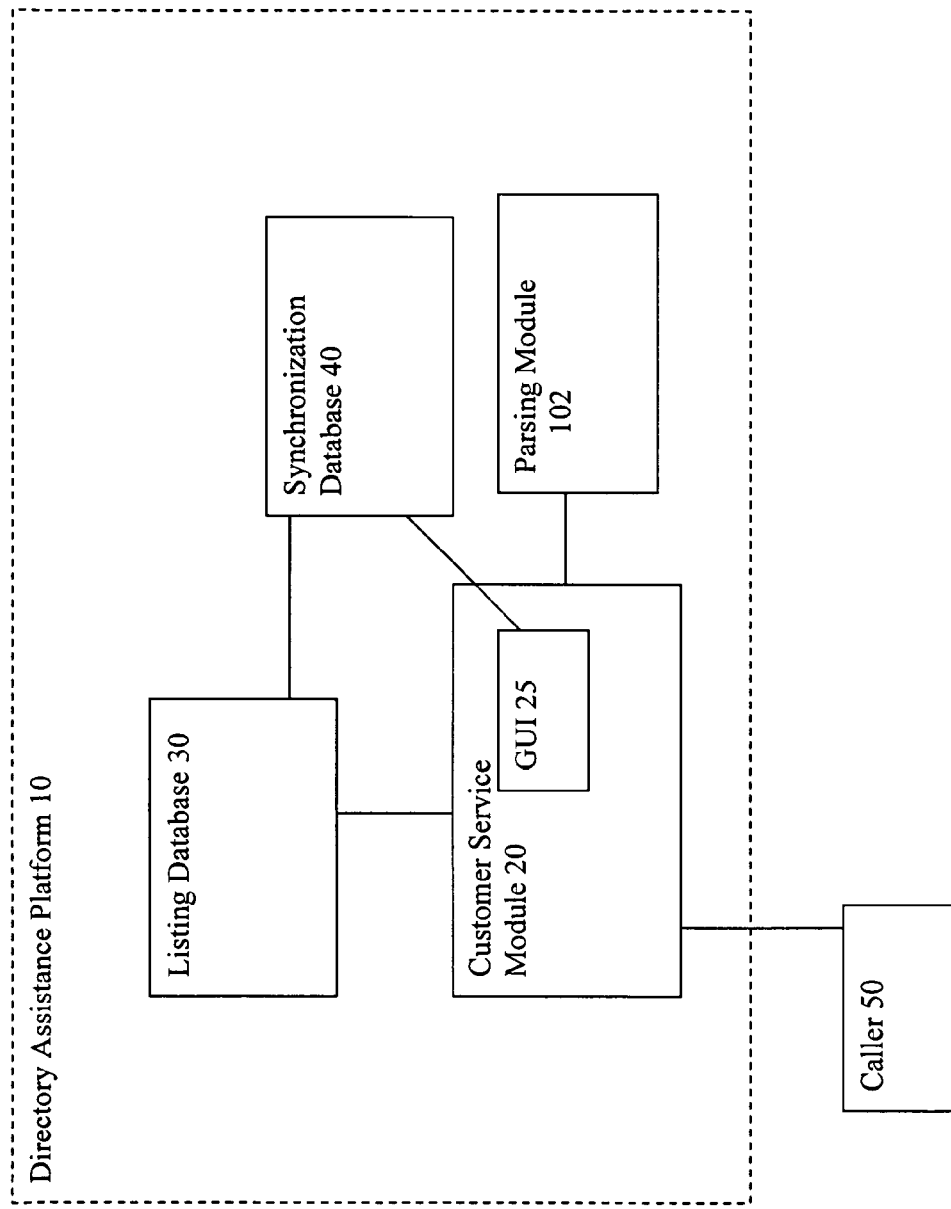
FIG. 1 is a system diagram of a directory assistance platform.

FIG. 1 illustrates a directory assistance platform 10 (DA platform 10) in accordance with one embodiment of the invention, having a customer service module 20, a listing database 30 and an update/data synchronization database 40. Directory assistance platform 10 is configured to allow requesters to interact with the system to update the category of the requested listing.

According to one aspect, a caller (requester) 50 initiates a communication to directory assistance platform 10 to request information, such as contact information for a business or personal contact. Although, only one DA platform 10 is shown, it is understood that the entire directory assistance system, and all of the features described herein, may employ or be employed on a plurality of Interconnected, yet geographically remote, DA platforms 10.

It is understood that Requester 50 and directory assistance platform 10 are configured to handle any form of communication there between, including but not limited to landline telephone calls, cellular telephone calls, VoIP calls, IM (chat sessions), SMS, e-mail, HTTP, or any other form of communication format. For simplicity in illustrating the salient features of the present invention, caller 50 is described throughout as a requester to directory assistance platform 10, requesting information for a business or personal contact (telephone number).

Customer service module 20 within DA platform 10 generally refers to the incoming call interface for handling caller 50 interaction with DA platform 10. For example, customer service module 20 may be a bank of live customer service operators for handling incoming calls, an automated directory assistance system or a combination of the two. Each of the below described features are equally employable under either live or automated arrangements.

As shown in FIG. 1, a graphical user interface 25 is employed by customer service module 20 as described in more detail below.

Listing database 30 is generally a typical database arrangement for use in DA platform 10 for storing various business and personal contact information (listings) for retrieval by customer service module 20 in response to a DA inquiry from caller 50. Any typical database arrangement including, off-site, redundant, $3^{rd}$ party managed and other commercially available database structures may be utilized.

Update/data synchronization database 40 is coupled to both customer service module 20 and listing database 30. As described in more detail below, as customer service module 20 elicits information from a plurality of requesters 50 an update listing 80 is generated and stored in synchronization database 40 for eventual merging with the corresponding record 60 in database 30.

It is understood that the above listing and description of modules is for exemplary purposes only and is in no way intended to limit the scope of the claims in the present application. For example, the functions of database 30 and synchronization database 40 may be merged into a single module. However, for the purposes of illustrating the various features, the two modules are separated for clarity. Additional modules may be added or features of different modules combined while still maintaining the salient features.

FIG. 2 illustrates a typical listing 60 as stored in database 30. Listing 60 generally, in addition to other contents, maintains an identification field 62, a name field 64, a contact field 66 and a category field 68. Name field 64 is easily understood as the name of the contact, such as "Jake's Pub" or some other business listing.

Contact field 66 is generally understood as the telephone and address of the contact as well as any other communication/connectivity information (web site, fax number etc. . . . ). Category field 68 includes the category name generally referring to the type of business (or "personal" for home numbers).

In the present example, "Jake's Pub" may include a "Bar/Pub" notation in category field 68. Identification field 62 is an internal database 30 number such as a number or alphanumeric code so that each listing 60 may be separately identified from one another. It is understood that additional fields may be included as desired.

FIG. 3 shows the graphic user interface 25 from FIG. 1 that is used by customer service module 20. In order to take advantage of input that may be collected from requester 50, GUI 25 of customer service module 20 is used to collect information about listing 60 that is derived from the directory assistance call. This information may be stored in updated listing 80 (FIG. 5) for delivery to synchronization database 40 as explained in more detail below.

It is noted that graphic user interface 25 may be entirely computerized within customer service module 20. For example, in a first arrangement, GUI 25 is utilized in real time by an automated or live operator to generate updated listing 80 during the call.

In a second arrangement, a parsing module is employed to automatically parse the information for storage in updated listing 80. The parsing module in one arrangement is configured to parse the necessary information while the requester is still interacting with the directory assistance module.

In yet another example, updated listing 80 may be generated sometime after the call, generating updated listing 80 by parsing a stored copy of the call, including any automated or live operator portions. Although in a typical directory assistance call, the requester interacts by voice, the invention is not limited in scope in that respect. For example, all types of directory assistance requests, such as those employing SMS, or other types of device interaction are contemplated herein. Furthermore, it is noted that any known parsing technique for a multimedia content, such as audio, video, or text data is employed in accordance with various embodiments of the invention to parse a recorded directory assistance interaction with a user in order to modify updated listing database 80.

Graphic user interface 25 ideally maintains a category update field 72, a rating update field 74 and flagged listing field 76, and a comment field 78 that is preferably used for storing any additional comments or statements made relating to the call and that are deemed relevant and useful by operator terminal 20. Such fields are used to collect data from caller 50 that may be used to enhance listings 60 as explained in flow chart FIG. 4 below. Category update field 72 may provide a series of possible category designations that are available on DA platform 10. Ratings update field may provide a series of ratings identifiers relating to the field of a particular listing 60 (eg. food ratings for restaurant listings etc. . . . ). It is noted that the ratings update field displays different qualitative assessments corresponding to the type of category requested. For example, ratings update field for a hotel listing would be different from a restaurant listing or a retail listing or a movie listing. Flagged listing field 76 is simply a designation field that allows customer service module 20 to add a note to a listing 60 that there is some problem with the listing. Comment field 78 is preferably used to allow customer service module 20 to add a note to a listing 60 that may be useful to future callers and may not fit within any of the more defined fields. It is understood that additional fields may be added or fields may be removed depending on which fields in listing 60 that DA platform 10 wishes to edit based on customer feedback.

Figure 4:
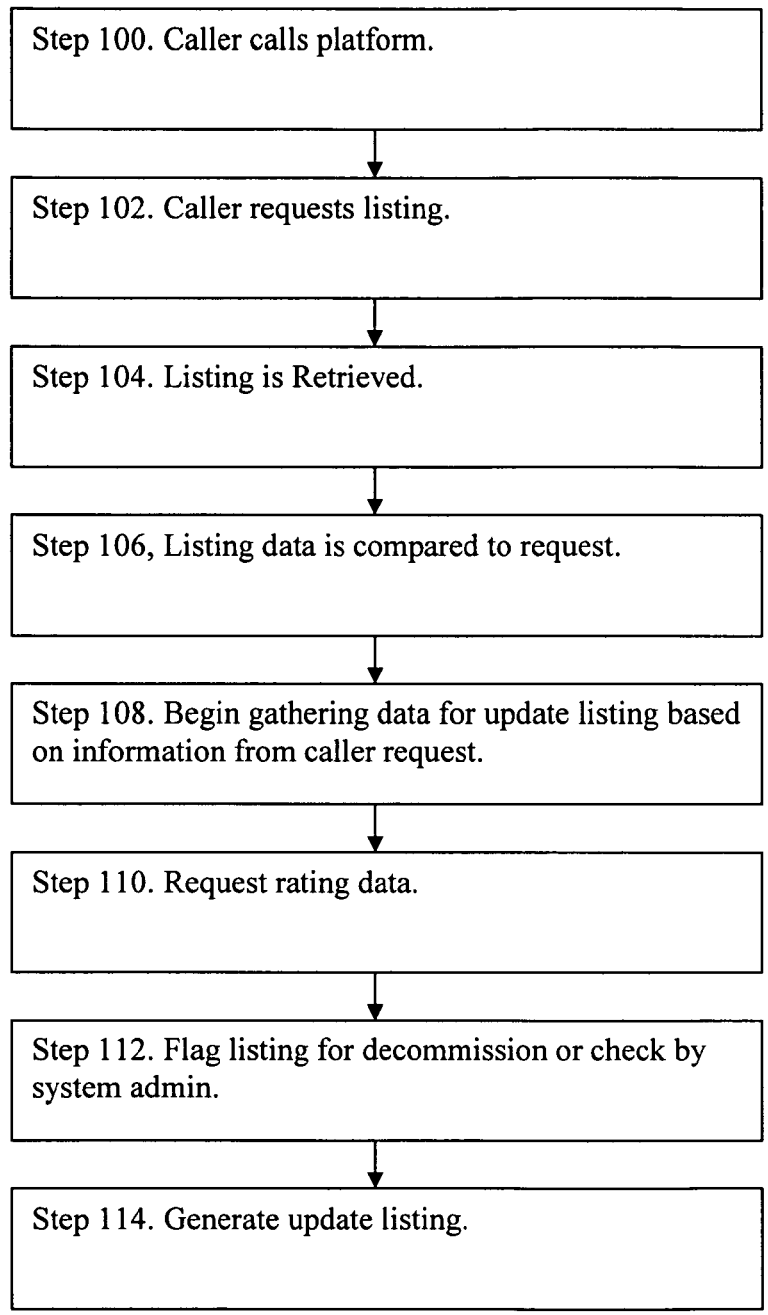
FIG. 4 is a flow chart for generating an updated listing.

FIG. 4 illustrates a typical DA call between a requester 50 and DA platform 20. At step 100, Requester 50 contacts DA platform 210 requesting a listing such as Jake's Pub. At step 102, Requester 50 identifies the listing using some data such as the address or category or combination of the two.

It is at this step that DA platform can begin to derive additional information for listing 60. At step 104, customer service module 20 retrieves listing 60 that matches the request of Requester 50. At step 106, the information in listing 60 is compared to the information provided to determine if a listing update is warranted. For example, when Requester 50 calls for Jake's Pub, they identify it as "a restaurant" and by address. However, when listing 60 is retrieved, Jake's Pub is listed as a Bar/Pub but not as a Restaurant. At step 108, the customer service module 50 begins generating an update listing 80 using the entries available on GUI 25 as noted above and shown in FIG. 3

In the present example, customer service module may then place an entry in the "Restaurant" marking on the GUI 25. This is used to reflect the fact that even though listing 60 shows Jake's Pub as a Bar/Pub, callers such as Requester 50 are identifying this listing as a restaurant. It is noted that in accordance with another embodiment of the invention, the system does not modify or update a category until a certain number of requesters have identified the listing with the modified or updated category. This embodiment assures that a category is not modified or updated based on few mistaken identifications from corresponding few requesters. The threshold for the minimum number of requesters sufficient to warrant a change or update of a category can be dynamically varied during the operation of the system, and can be set to any threshold from as little as one requester 50.

At step 110, customer service module 20 may further ask Requester 50 if they have previously used or purchased the goods or services provided by the listing. If so then customer service module 20 may attempt to elicit further rating information about the food, prices, etc. In another example, customer service module 20 also elicits comparisons to other listings 60 previously requested by requester 50. Thus, the generated update listing 80 may be synchronized with not only the corresponding requested listing 60 but also to other listings 60 that may be subjected to comparison notes or contain other interconnected data. For example, if requester 50 requests "Jake's Pub" and indicates that "it is as good as Mike's Pub for international soccer game coverage," then such a note may be placed in comment field 78 and updated in both the listing 60 for "Jake's Pub," and Mike's Pub." In another example, customer service module may also elicit a new set of ratings for Mike's Pub, either because the requester had never rated this listing, or because a predetermined time had elapsed since the last rating by the same requester.

As mentioned before, the additional categories and ratings questions are different from one another, based on the primary category already shown in listing 60. For example, if the requested listing is a hardware store, then the possible additional categories displayed in GUI 25 would be for other related categories, and the ratings may include price and tool availability/stock, knowledge of the sales people and service, as opposed to ratings for a restaurant, which may include ratings for décor, food, price and service. Again, these ratings can be shared by other requesters who will call the Directory Assistance platform to request a listing. The system can provide cross listings based on the ratings established so far. For instance, the customer service representative or the automated system, after providing the requested listing may ask the requester if they are interested to receive information about other listings in the same requested category that have a higher rating based on prior surveys from prior requesters. This service may be employed in conjunction with an advertising sponsored campaign, wherein the referred listings with better or different ratings pay advertising fees or referral fees for the cross listing.

In another embodiment of the invention, requesters can be notified that they may benefit from a free directory assistance call if they are willing to receive advertising information from other businesses in the same category with ratings different (and preferably better) than the ratings of the requested listing.

Furthermore, the rating information, in accordance one embodiment of the invention is employed if the caller can be authenticated. For example, ratings from callers that can be identified based on their calling number identification, or by other means, and who are previously registered, can be used for updating a listing's ratings. This feature further assures that biased calls from requesters affiliated with a listing are not calling to artificially enhance a listing's ratings.

As a separate step 112, if Requester 50 is calling back to DA platform 10 because a previous listing 60 provided to them did not work, it is likely upon requesting the same information, that the same listing will be retrieved by customer service module 20. In such an instance, customer service module 20 may confirm such information, make a note in flagged listing field 76 of GUI 25 and then proceed to provide a different listing to Requester 50 in hopes of completing their call. This arrangement updates the listing database with numbers that have become stale and may prompt the customer service representatives to update the listing with a correct number.

Once all of the above information is collected, at step 114, customer service module 20 generates an update listing 80 as shown in FIG. 5, based on the information input on GUI 25.

Update listing 80 maintains a listing identifier field 82, corresponding to the listing identifier field 62 of listing 60 so that update listings 80 may be properly connected to their appropriate listing 60 during an update session. Update listing 80 further maintains an update field 84 that contains update instructions for listing 60 such as new category information, rating information, listing cancellation information, comment information or other such update material derived from the call. As mentioned before, update listing 80 can be modified during the interaction with requester 50 or later, after completing the call with requester 50.

In the present example, assuming Requester 50 having requested Jake's Pub as a "restaurant" and having provided ratings of "affordable price" "good quality food" an appropriate update listing 80 is generated as shown in FIG. 4. This listing is sent by customer service module 20 to update synchronization database 40 for storage. Then periodically, synchronization database 40 and listing database 30 link and share data so that all appropriate listing 60 for which an update listing 80 exists are updated (using identifier fields 62 and 82 to match updates to original listings. By this arrangement, DA platform 10 is able to, while providing listings to callers, simultaneously derive additional and updated data about that same listing so as to enhance the listing data available to the system.

It is understood that the above illustrates only one example of how Requester 50 derived data may be used to obtain additional data about a listing. The full range of available category, rating and review/comment data that may be obtained about each type (category) of listing is too numerous to list in full.

Furthermore, the time that update listing 80 is generated is flexible. For example, in the above illustration, update listing 80 is generated after the call example. However, in accordance with another embodiment, update listing 80 is generated in real time by customer service module 20. The synchronization of update listing 80 and listing 60 may occur at a later time (eg. Off-line) or as a real-time update while a request is being handled.

Figure 6:
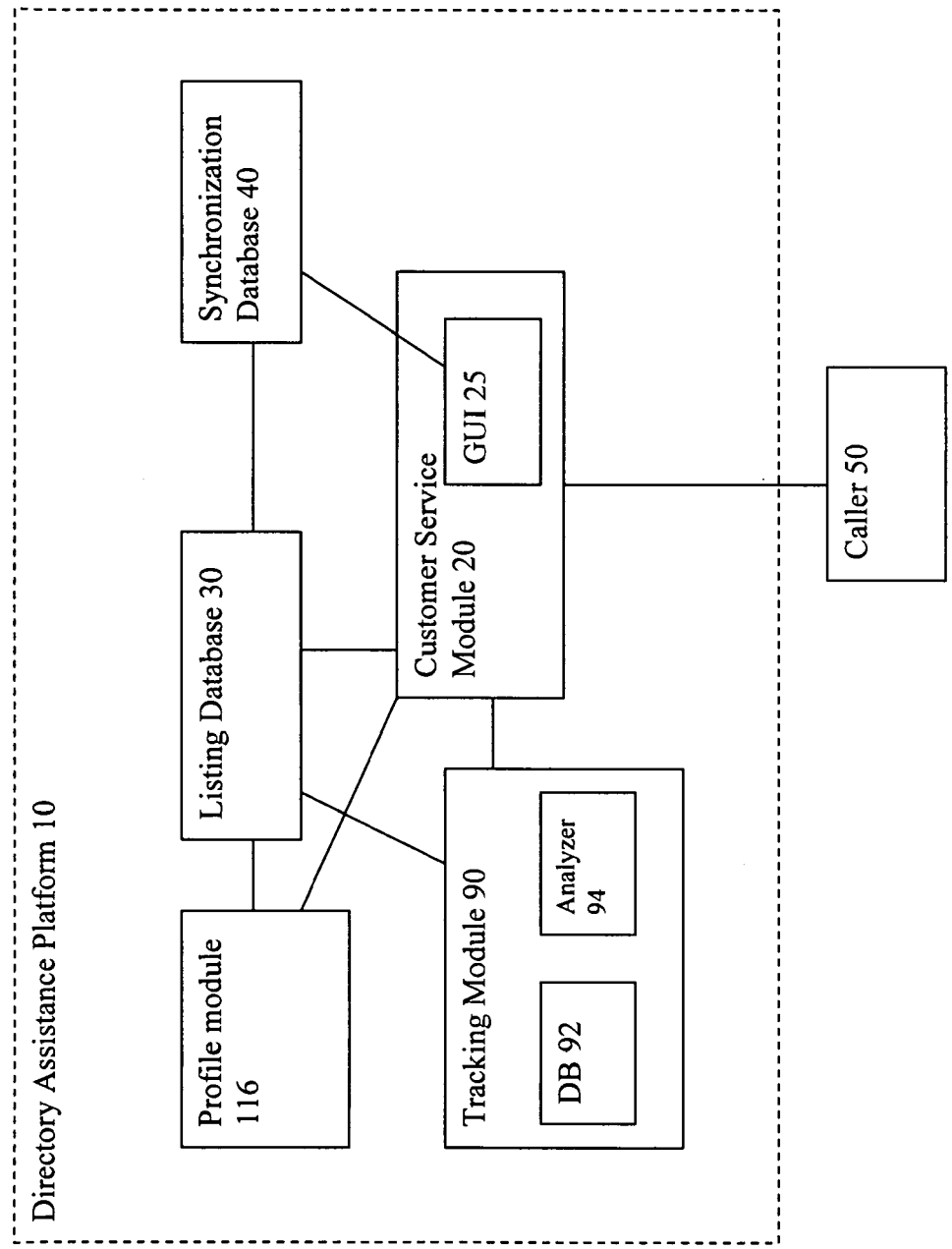
FIG. 6 is a system diagram of a directory assistance platform.

In another embodiment shown in FIG. 6, DA platform 10 further includes a tracking module 90 and a profile module 116. Tracking module 90 includes a tracking database 92 and a tracking analyzer 94. In accordance with various embodiments of the invention, DA platform 10 is configured to track all requests made for listings and analyze those listings to mine various information that may enhance the performance of the DA platform, and that may benefit businesses to derive additional advertising and marketing data that can be employed to enhance their marketing campaigns.

As shown in FIG. 7, profile module 116, maintains stored caller profiles 120 used for frequent callers or subscribers who have registered with DA platform 10. It is understood that DA Platform 10 is capable of identifying requesters 50 so that in addition to having personal call handling preferences, the requesters may also have their personal information stored and utilized by DA platform 10 to enhance the ability to provide more targeted listing responses to all callers as explained in more detail below.

Typical profiles 120, may include caller identifier field 122, caller preferences 124 and caller personal data field 126. Caller identifier field includes the information for identifying the requester, such as name and also information for identifying devices with which requester 50 employs to make directory assistance calls. In accordance with one embodiment of the invention, caller identifier field 122 also includes a voice print of the requester, that can be employed to identify the requester based on the requester's voice only, regardless of the device used to interact with the DA platform 10.

Caller personal data field 126 may include personal information such as (likes/dislikes) information such as sports fan and more specifically, "Soccer Fan," "movie fan" and more specifically the "movie genre" "restaurant fan" and more specifically "type of food," or other personal identifying data/group membership data, such as their employment information (actor, engineer, doctor, etc. . . . ) and geographic information such as areas in which they generally request information.

Additional fields may be employed as desired to store additional caller data. This information may include demographics, such as age, gender, address, salary range, education, hobbies, home ownership and address, vacation home ownership and address, preferred travel destinations, marital status, children, pets, products and services regularly used by the requester, books, movies and music recently purchased or used by the requester and etc.

In one embodiment of the invention, tracking database 92 also checks various available databases to determine whether based on the information provided the user is a celebrity or a publicly known figure.

Tracking database 92 is coupled to profile module 116, database 30 and customer service module 20 and is configured to generate a tracking database record 130 for each incoming call to DA platform 10. For example, when Requester 50 places a call to DA platform 10 and requests a listing, all relevant information about that call is tracked by module 90 and placed into tracking database record 130.

FIG. 8 is an exemplary tracking database record 130, having a UCI field (Universal Call Identifier) 132 which maintains a unique identifier code for that call. Database listing field 134 includes a record of the retrieved listing for that call. Time/date field 136 includes the time and date of the request placed by Requester 50.

A call request field 138 maintains information related to the requested data asked by Requester 50. For example, if the call for record 130 was a category Restaurant request then that data would be stored in field 138. In another example, Requester 50 may make a specific listing request which would also be stored in field 138. The combination of field 138 and listing field 134 ensures that call tracking record 130 includes information about what was asked for (field 138) and what was provided in response (field 134).

Caller data field 140 includes data about the Requester 50 who placed the call. As noted above, frequent callers who are identified by DA platform 10 may have a profile 120 including the caller's personal information 126. In the case of non-frequent callers or requesters 50 who otherwise have no stored profile 120, then caller data field 140 may either be blank or simply include the telephone number (or other contact identifier) of Requester 50.

Furthermore, DA platform 10 may attempt to elicit some information from requester 50 so as to generate a profile for the new requester. In accordance with one embodiment of the invention, every time that a requester 50 contacts the DA platform, the system determines whether profile 120 for the requester is complete, or requires updating, and if so the system determines the most pertinent information that is necessary to update the profile and attempts to elicit that information from the requester.

As such the requester can be gradually prompted over a number of requests to add all relevant profile information based on a descending order of priority of a predetermined type of information that the system deems important to update. In accordance with other embodiments, the system automatically stores and updates the required fields that need to be updated and prompts the live or automated agent to ask the next in a series of questions to update the database as desired. These required fields can vary by category or listing but the system cycles through them, until all pending questions are completed on subsequent calls.

The arrangement for continuously and gradually updating desired information from requesters prevents requesters from getting bored or impatient with providing information in response to a lengthy and time consuming survey questions. As information in caller information field 140 is gathered, it is periodically synchronized with profile 120.

In accordance with one embodiment of the invention, caller info field 140 also stores a sample of requester's voice for identifying the requester. As such the stored voice sample can be compared with voice prints stored in caller id field 122 of each prior stored requester. This approach allows a requester to be identified regardless of the type of device they employ to interact with directory assistance platform 10.

In accordance with various embodiments of the invention, caller data field 140 includes identifying information corresponding to any device with which the requester is contacting the directory assistance platform 10, such as requester's mobile phone and landline numbers, \AMP identification, such as IP address or MAC address, email address, or ENUM address. As such, DA platform 10 is enabled to identify a requester by comparing the identification information it receives when the requester contacts the platform with the information it has stored in data field 140.

Thus, as shown in FIG. 8, caller data field 140 includes personal data from the requester so that tracking record 130 further includes personal data about the requester making the request. It is contemplated that additional fields may be added to tracking database record 130 as desired.

Periodically, analyzer module 94 of tracking module 90 may employ algorithms to review DA platform 10 call data as stored in tracking database 92, by reviewing the fields of call tracking records 130 to identify certain trends in directory assistance call placed to platform 10.

Such trends may include but are not limited to, time and date data for particular listings (providing most frequently called listings over particular time periods); time and data for certain categories (providing most frequently called categories over particular time periods); time and date data for particular requesters (providing frequently requested listing data for a particular requester); time and date data for a particular category of requesters that share one or more demographic component, such as requesters in a specific age group, gender, profession, celebrity status, and requesters with a particular interest in music, sports, food, service or merchandise. The trends may also include time and date data for requesters generating requests from a particular geographic attribute (such as zip codes, streets, or even more particular geographic locations such as amusement parks, theaters, malls, parks, inside identifiable buildings, schools, community centers etc) from which requests are being made.

It is contemplated that such data is used to provide enhanced services to future callers 50 to DA platform 10 by allowing for additional requests or enhanced performance in retrieval of requests as discussed below.

Figure 9:
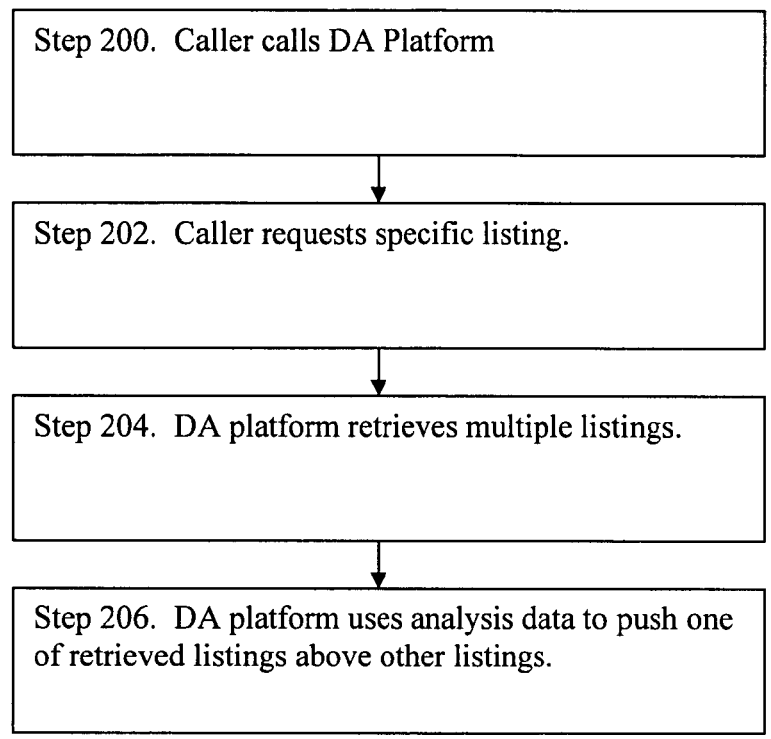
FIG. 9 is flow chart depicting an exemplary use of the directory assistance platform of FIG. 6.

In accordance with one embodiment, FIG. 9 shows a flow chart for using the analysis data to provide better search results from the customer service module 20. For example, analyzer module 94 may determine that at a particular time of day (eg, 7:00-8:00 pm Thursday to Saturday) there are increased requests for listings under the category "movie theaters." Such data may be able to be used to differentiate between competing listings 60 where more than one fits the description provided by Requester 50.

Thus at a first step 200, Requester 50 calls DA platform 10. At step 202, Requester 50 requests a specific listing such as "New Rock" in New Rochelle N.Y. At step 204, customer service module 20 retrieves a number of listings 60 in New Rochelle having the same name and location. However, at step 206, DA platform 10 using the data from analyzer 94 notes that the call is placed on Thursday at 7:45 pm. As such, a listing 60 for "New Rock" in New Rochelle that also has the category "Movie Theater" in category field 68 is either provided to the caller immediately or is offered to the caller (e.g. "were you looking for "New Rock" movie theater in New Rochelle?")

As such, by using the data derived from analyzer module 94 it is possible to enhance the accuracy and rate at which listings 60 are provided to Requester 50 by customer service module 20.

Figure 10:
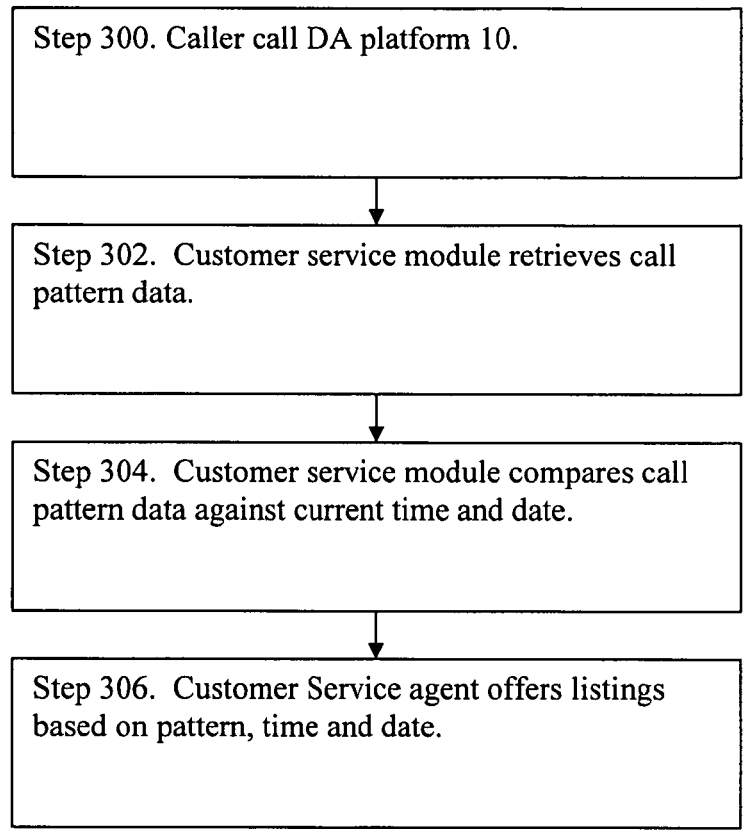
FIG. 10 is flow chart depicting an exemplary use of the directory assistance platform of FIG. 6.

In another example as shown in Flow chart FIG. 10, the history of a particular Requester 50 may be used to provide information to Requester 50 with improved search results. For example a particular caller may use DA platform 10 to connect to a particular listing 60 (eg. their barber) every fourth Saturday. Analyzer module using tracking listings 130 may identify this pattern in their call requests.

At step 300, Requester 50 calls DA platform 10 and connects to customer service module 20. As soon as Requester 50 is identified (using their MIN or other identifier) at step 302, module 20 may immediately retrieve call patterns for this Requester 50. At step 304, once the pattern is retrieved, if the call time and date is within a certain parameter (such as on one of the aforementioned $4^{th}$ Saturdays) then, even before Requester 50 makes the request, the customer service agent may ask "are you looking for "XYZ barber." Furthermore, in accordance with one embodiment of the invention, the search screen for customer service representative may already contain a listing of items that the requester is most probably requests, based on the predictive analysis described above. In accordance with this feature, the customer service representative, even before initializing a search may have the information requested presented to them on their search screen.

In accordance with another embodiment, goods and service providers are enabled to use such period patterns to their benefit to push more targeted advertising to their existing customers. In the same example described above, the barbershop can send reminder advertising messages to customers who have called for directory assistance on a predictive periodic basis. Similarly, flower shops can send reminder advertising messages to customers who had previously requested their listing.

In accordance with one embodiment, the advertising messages can be sent based on a prior pattern of requests made by the requester or based on times of the year that such a request is expected. To this end the flower shops can send reminder advertising messages few days before Valentine's day to all requesters who have previously requested their listings.

Again, such an arrangement and using the data derived from analyzer module 94 it is possible to enhance the accuracy and rate at which listings 60 are provided to the particular Requester 50.

Figure 11:
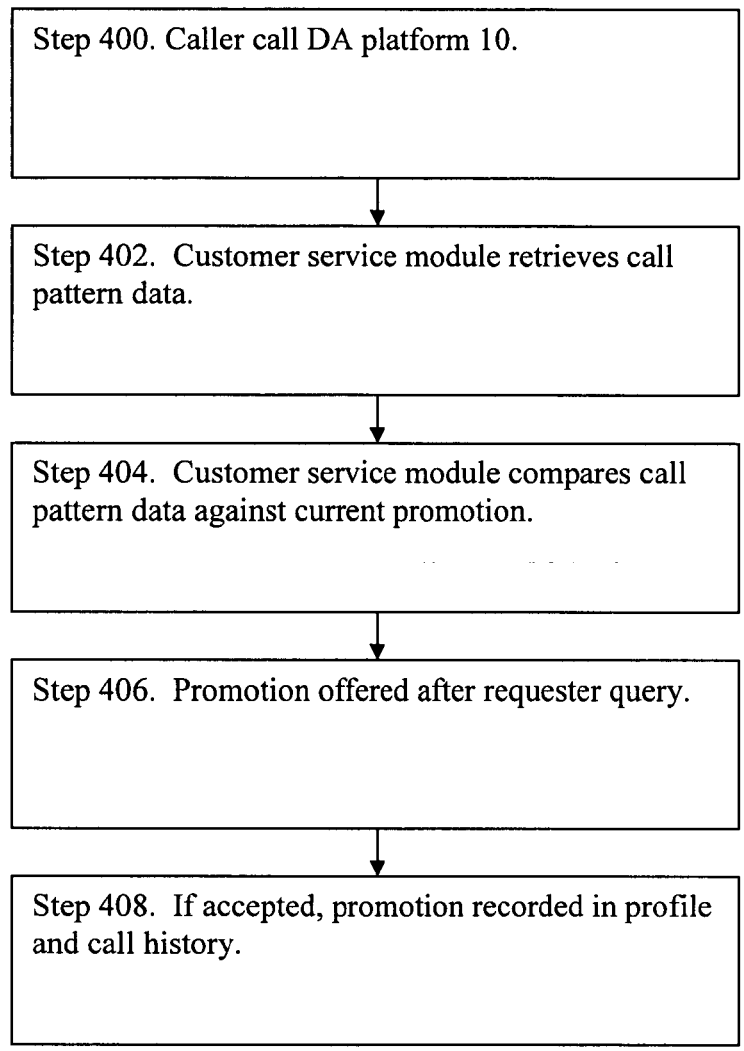
FIG. 11 is flow chart depicting an exemplary use of the directory assistance platform of FIG. 6.

In another example as shown in Flow chart FIG. 11, the history of a particular category/and or specific listing may be used to provide a Requester 50 with improved search results. For example, an analysis of tracking records 130 provides the frequency of requests for particular listings, listing categories, and listings in a particular category. Analyzer module using tracking listings 130 may identify such trends to determine which are the fastest rising or most frequently requested listings in general or in a specific category.

At step 400, Requester 50 calls DA platform 10 and connects to customer service module 20. At step 402 Requester 50 may ask what is the most frequently requested listing in the restaurant category for New York City. Alternatively, Requester 50 may ask for the most requested Pub/Bar in New York City. At step 404, customer service module 20 provides the desired information to Requester 50 based on the analysis from analyzer module 94. It is noted that DA platform 10 may provide frequently requested listings in any category—or other results of trending analysis—to a requester, even if the requester was not looking for that information. This information may be provided based on a paid advertising model, wherein top candidates in any category would like to make their relevant information available to requesters on a paid advertising basis Such analysis results may be adjusted to expand or contract the time frames. For example, most frequently requested listings for restaurants may be calculated over the past few hours, days, weeks or month whereas most frequently requested hardware store may be over the last year.

Figure 12:
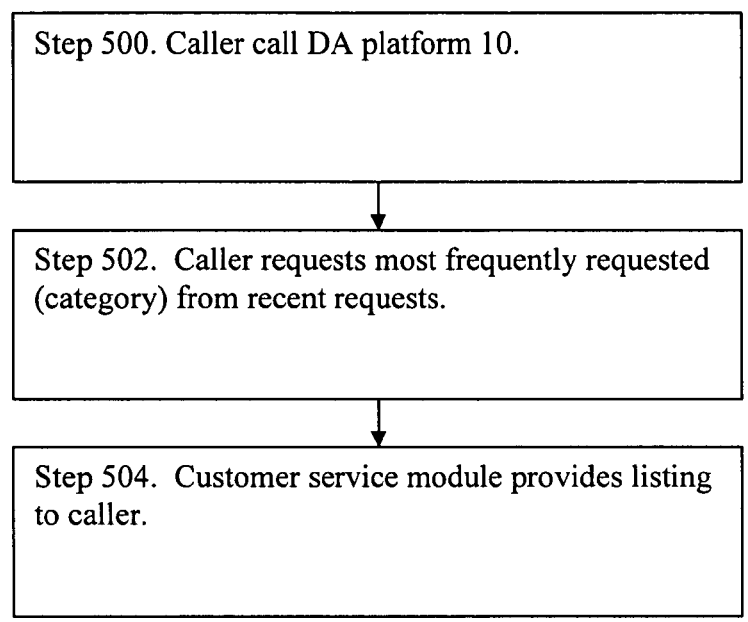
FIG. 12 is flow chart depicting an exemplary use of the directory assistance platform of FIG. 6.

In another example as shown in Flow chart FIG. 12, the history of a particular category/and or specific listing may used to provide a Requester 50 with improved search results and further enhanced based on the personal data from field 140. For example, an analysis of tracking records 130 provides the frequency of requests for particular listings, listing categories, and listings in a particular category as well as the personal data of the callers 50 who made those requests. Analyzer module 94 using tracking listings 130 may identify trends by both category requested as well as who made those requests so that callers may obtain popular listings that other callers with similar interests or similar lines of work (personal data) have also asked for.

At step 500, Requester 50 calls DA platform 10 and connects to customer service module 20. At step 502 Requester 50 may ask what is the most frequently requested listing in the Bar/Pub category for New York City that are being requested by "soccer fans". Alternatively, Requester 50 may ask for the most requested Restaurant in New York City that is frequented by "actors". At step 404, customer service module 20 provides the desired information to Requester 50 based on the analysis from analyzer module 94.

In accordance with another embodiment, all exemplary requests mentioned above can also be augmented with request for the best ratings for any requested listing. As such requester 50 may ask for example for the best rated restaurant in New York City that is frequented by "actors," or it has been best rated by "actors."

The above embodiments of providing enhanced search results to callers 50 are intended to be exemplary. It is contemplated that analyzing the tracking information obtained from millions of requesters, can yield any number of trends or other desirable information for use by/desired by subsequent callers 50. These trends can be used to populate the customer service representative's search screen, even before a requester has made a request. For example, by identifying a caller, at specific time of the day or the specific location of the caller, the most requested listings for goods and services for that time of the day or that location are pre populated before other search criteria is entered.

In accordance with one embodiment of the invention, the pre-populated information may be generated based on the caller's previous request history and/or other callers request history for that same point in time or geography or some combination of the caller's request history and analysis of the requests of other callers who have asked for like listings by category or time of day or day of week or day of year or geography. For example, if a requester tends to go to a certain-type of restaurant every Friday night, then the pre-populated information may include several restaurants in the requester's price range or food-type or service quality or even just the same general geographic area that might be of interest to the requester. As a second example, other callers may request a specific movie theater when asking for that listing. In this case, the system would be able to offer that movie theater option to requester as it predicts that the requester is going to call for a restaurant on Friday night. However, the invention is not limited in scope to such examples. In general the system can analyze any desired to provide clear guidance on what the next requester might be interested in.

In accordance with another embodiment, the system also tracks the rate of acceptance or rejection of the pre-populated listings. To this end, as the pre-populating process is used over time, the system becomes more "intelligent" as it "learns" from caller acceptance what pre-populated listings are accepted or rejected. This trends analysis may be made available and provided to enhance offerings to requesters who might benefit from it, regardless of the category of listing requested or profile attribute of the requester. Again, such offerings can be provided based on a paid advertising model.

Figure 13:
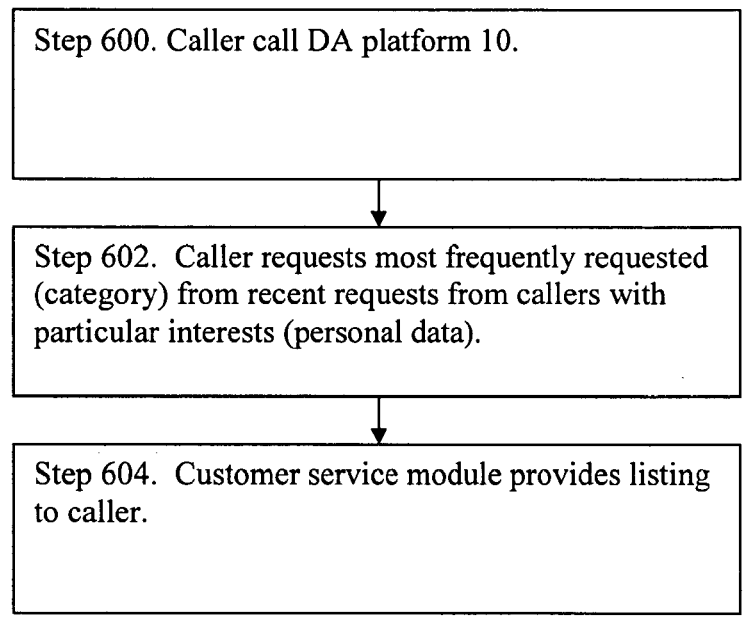
FIG. 13 is a system diagram of a directory assistance platform.

In another embodiment, FIG. 13, shows the DA platform from FIG. 6 with an added voice recognition module 175. This voice recognition module 175 is capable of recognizing voice patterns from Requester 50 so as to identify them. It is contemplated that for frequent users DA platform 10 may utilize an extra field in profile 120 that includes a voice identification print.

Furthermore, regardless of the Requester 50 (account holder or random), voice recognition module 175 may also be used in conjunction with tracking module 90 for use in disambiguation of automated directory assistance calls from requesters 50.

Figure 14:
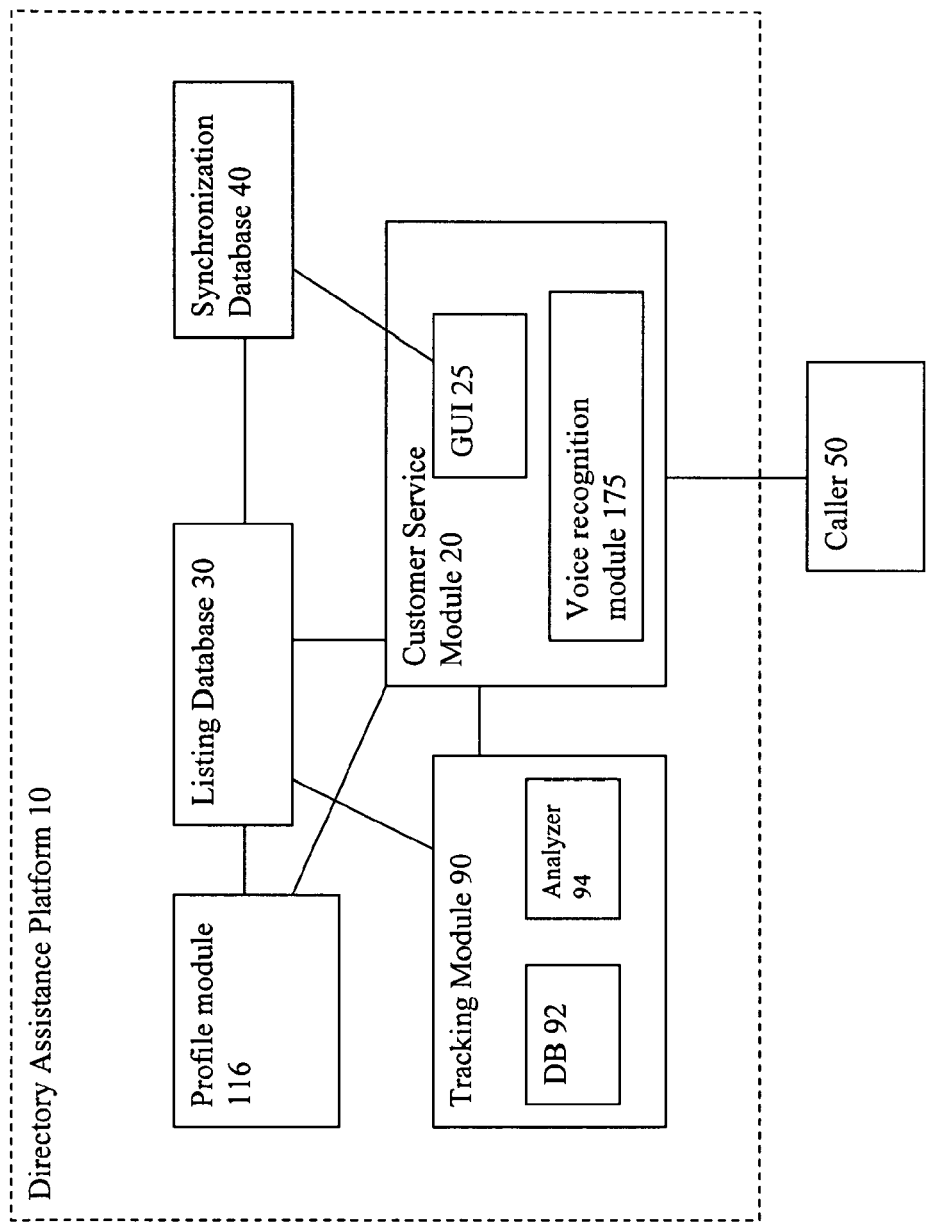
FIG. 14 is flow chart depicting an exemplary use of the directory assistance platform of FIG. 13.

In a first example, as shown in flow chart FIG. 14, at step 600 a Requester 50 contacts DA platform 10. At step 602, voice identification module 175 records the voice request of Requester 50 in order to identify the request and search for responsive information.

Despite the recent advances in voice recognition systems, automated DA platforms still experience difficulty in resolving voice requests made by requesters.

In accordance with one embodiment of the invention, the pattern of listings identified by tracking module 90 can be used to disambiguate a voice request. For instance, once the voice request has been analyzed and the system has been able to find for example, few listings that may potentially match the voice request, voice recognition module communicates with the tracking module to determine the listing with the highest probability.

Figure 15:
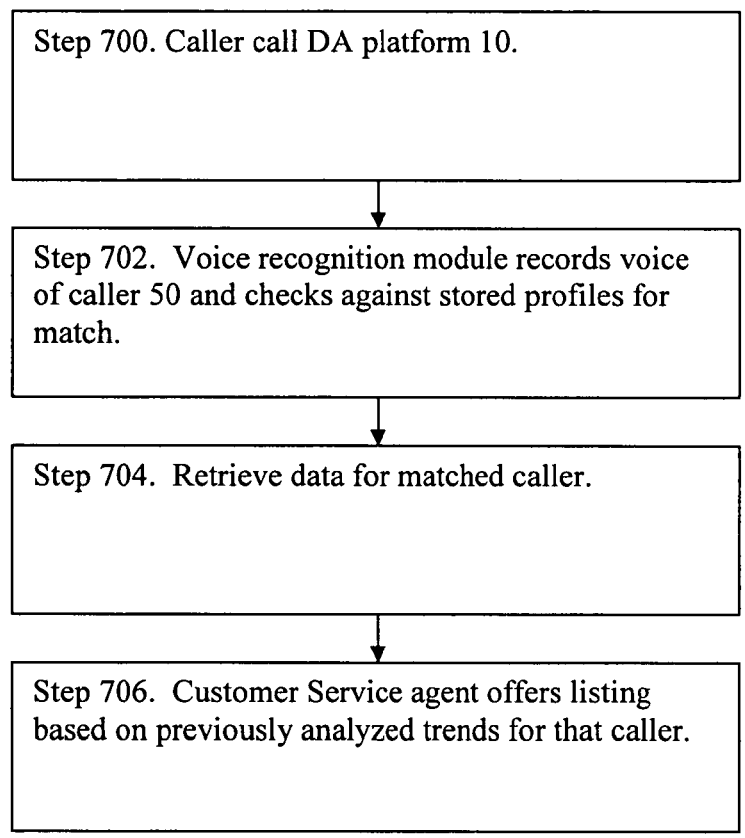
FIG. 15 is flow chart depicting an exemplary use of the directory assistance platform of FIG. 13.

As shown in flow chart FIG. 15, at step 700, Requester 50 calls DA platform 10. At step 702, Requester 50 requests a specific listing and category, such as "New Rock" "movie theater" in New Rochelle N.Y. At step 704, customer service module 20 retrieves a number of listings 60 that may match the request. In the present example, the retrieved matches may include "New Rock" (movie theater) "N.Y." (movie theater), "New Rourke's" (movie theater).

At step 706, tracking module 90 is contacted to determine whether any predictive patterns can be identified that may match the request. For example, from a category search analysis, "New Rock" may be identified in the top requested listings for movie theaters. At step 708 the system resolves the ambiguity based on the information provided by tracking module 90 and estimates that the matched result is "New Rock" movie theater. The Requester 50 may be provided that listing 60 immediately or may be prompted with, "were you looking for "New Rock" movie theater in New Rochelle?"

In another embodiment of the invention, tracking module 90 may include prior listings requested by the same requester. To this end, DA platform 10 also searches for any possible listings that may match the voice print of the requested listing. For the same example above, if the requester has previously requested "New Rock" movie theater, the system may resolve the ambiguity in favor of the prior requested listing by the same requester. Furthermore, if the requester has previously requested "New Rock" movie theater numerous times, the system may resolve the ambiguity in favor of the prior requested with a substantially higher degree of certainty.

As such, by using the data derived from voice recognition module 175 from the current call as well as analysis of previous requests it is possible to enhance the accuracy and rate at which listings 60 are provided to Requester 50 by customer service module 20.

In addition to matching the voice print to determine previous requests by that requester, it is also possible to link different requesters 50 and determine that they are the same person using different devices by analyzing the request history. For example, a person who goes to get a haircut every four to six weeks at the same place and requests that listing regularly over the course of several years may provide the system with the ability to match the different devices that are used in placing these requests when cross-analyzed with that same person's penchant for visiting a certain restaurant every Saturday morning. The trend analysis among different requester histories alone or when paired with the voice prints enables the creation of a single caller history across multiple devices and dramatically improve the efficiency of the voice recognition accuracy, the live agent accuracy and the efficacy and conversion of the advertising proposals.

While only certain features of the invention have been illustrated and described herein, many modifications, substitutions, changes or equivalents will now occur to those skilled in the art. It is therefore, to be understood that this application is intended to cover all such modifications and changes that fall within the true spirit of the invention.

What is claimed is:
1. A method for providing directory assistance, said method comprising the steps of:
receiving a communication from a requestor for a desired contact listing;
retrieving a requester profile relating to said requester, said profile including a calling history of said requester; and
retrieving at least one listing in response to said communication for a desired contact listing, wherein said retrieving of said desired listing includes reviewing said calling history of said requester and including, among said at least one retrieved response, a predictive listing, wherein said predictive listing is generated based on the fact that the said communication for a desired contact listing is made at a time and date that corresponds to a regularly occurring listing in said calling history of said requester.
2. The method as claimed in claim 1, wherein when said communication for a desired contact listing is made at a time and date that corresponds to a regularly occurring listing in said calling history of said requester, and said request is not for said regularly occurring listing, said method further comprises the step of providing a reminder to said requester regarding said regularly occurring listing.

3. The method as claimed in claim 2, wherein said reminder is in the form of an advertisement to said requester.

4. The method as claimed in claim 1, wherein said profile relating to said requester includes a voice print of said requester.

5. The method a claimed in claim 4, wherein said voice print of said requester is used to disambiguate one contact listing among a plurality of retrieved contact listings.

6. A method for providing directory assistance, said method comprising the steps of:
   receiving a communication from a requestor for a desired contact listing;
   retrieving a requester profile relating to said requester, said profile including a calling history of said requester; and
   retrieving at least one listing in response to said communication for a desired contact listing, wherein said retrieving of said desired listing includes reviewing said calling history of said requester and including, among said at least one retrieved response, a predictive listing, wherein said predictive listing is generated based on the fact that the communication for a desired contact listing is made at a time and date that corresponds to a regularly occurring category search in said calling history of said requester.

7. The method as claimed in claim 6, wherein when said communication for a desired contact listing is made at a time and date that corresponds to a regularly occurring listing in said calling history of said requester, and said request is not for said regularly occurring listing, said method further comprises the step of providing a reminder to said requester regarding said regularly occurring listing.

8. The method as claimed in claim 7, wherein said reminder is in the form of an advertisement to said requester.

9. The method as claimed in claim 6, wherein said profile relating to said requester includes a voice print of said requester.

10. The method a claimed in claim 9, wherein said voice print of said requester is used to disambiguate one contact listing among a plurality of retrieved contact listings.

\* \* \* \* \*